United States Patent [19]

Kim

[11] Patent Number: 5,532,477

[45] Date of Patent: Jul. 2, 1996

[54] OPTICAL PICKUP APPARATUS HAVING LENS GROUP FOR DETERMINING PATHS OF AN INCIDENT BEAM AND A REFLECTED & BEAM

[75] Inventor: Seong-Min Kim, Incheon, Rep. of Korea

[73] Assignee: Daewoo Electronics Co., Ltd., Seoul, Rep. of Korea

[21] Appl. No.: 452,513

[22] Filed: May 30, 1995

[30] Foreign Application Priority Data

May 30, 1994 [KR] Rep. of Korea .................. 94-11851

[51] Int. Cl.$^6$ ............................... G01J 1/20; G02F 1/01
[52] U.S. Cl. .................... 250/225; 250/201.5; 359/494
[58] Field of Search ........................... 250/201.5, 225; 359/485, 487, 494, 495; 369/44.11

[56] References Cited

U.S. PATENT DOCUMENTS

| 4,564,631 | 1/1986 | O'Hara et al. ..................... 359/495 |
| 5,272,550 | 12/1993 | Dickson et al. .................... 359/485 |
| 5,404,490 | 4/1995 | Matsubayashi et al. ............ 359/494 |

Primary Examiner—Stephone Allen
Attorney, Agent, or Firm—Fish & Richardson

[57] ABSTRACT

In an optical pickup apparatus, a laser beam is generated from a laser source toward a lens group for reading out information written on an information recording medium. The lens group determines paths of an incident beam to the information recording medium and a reflected beam from it. The lens group includes a polarization converting element such as a λ/4 plate, a λ/8 plate, or a 80/16 plate for polarizing a beam transmitted therethrough and a birefringent prism to refract the beam depending on the polarized state and an objective lens through which the beam is transmitted to be focused on the information recording medium. The laser source generates an ordinary ray composed of a linearly polarizing component to be refracted ordinarily in the birefringent prism. A photodetector receives the beam polarized and refracted by the lens group. The lens group is arranged in the order of the diffraction grating, the birefringent means, and the polarization converting means from the bottom. After the beam emitted from the laser source is transmitted through the diffraction grating, the birefringent prism and the polarization converting element in that order, the beam is incident on the recording medium and then reflected from it, and inversely transmitted therethrough, and then the beam is received by the photodetector so that an information reading operation, and a tracking and focusing control operations are performed.

14 Claims, 4 Drawing Sheets

OPTICAL PICKUP APPARATUS HAVING LENS GROUP FOR DETERMINING PATHS OF AN INCIDENT BEAM AND A REFLECTED & BEAM

BACKGROUND OF THE INVENTION

1. Field of the Invention

The present invention relates to an optical pickup apparatus, and more particularly, an optical pickup apparatus for performing an information reading operation, and the tracking and focusing control operations.

2. Description of the Prior Arts

Data recording/reproducing apparatuses using optical disks such as a laser disk (LD) and a compact disk (CD) have been commercially available in recent years. There has been developed the optical pickup apparatus in which a laser beam is irradiated onto a data recording track (hereinafter referred to as a "track"), and data are reproduced based on the beam reflected by the track in order to read out data from an optical disk.

When the tracks are helically formed on the optical disk, since the sectors of a single track are not equidistant from the center of the rotation of the disk due to the eccentricity in the disc, tracking (radial) control is necessary in the read mode accurately irradiate the track with a laser beam. Even if the tracks are concentrically formed, sectors of a single track are not equidistant from the center of the rotation of the disk due to the eccentricity in the disk, and therefore, tracking control is essential. This tracking control has been conventionally performed by one beam method (a push-pull method) using single laser beam to read out the information (U.S. Pat. No. 4,767,921 issued to Ryoichi) or a three beams method (out-trigger method) wherein the single laser beam is separated into three beams by the diffraction grating and so on to read out the information (U.S. Pat. No. 4,973,886 issued to Matsuoka and U.S. Pat. No. 5,073,888) issued to Takahashi, etc).

That optical pickup apparatus is constructed in such a manner that one beam or three beams which have been formed from a beam irradiated from the laser source by the one beam method or three beams method, may be reflected by or transmitted through the optical disk to derive the tracking error signal, and so the tracking actuator may be operated in response to this tracking error signal to perform cooperative tracking.

Meanwhile, since the distance between the optical pickup and the disk shifts minutely in the read mode wherein the disk is being rotated, it is difficult to correctly read out data due to the shift, thus rendering focusing control essential. This focusing control has been conventionally performed by astigmatic method using an astigmatism phenomena (U.S. Pat. No. 4,684, 799 issued to Takanori) or a knife edge method (U.S. Pat. No. 4,684,799 issued to Masami et al., U.S. Pat. No. 4,868,377 issued to Kiochiro), etc.

The optical pickup apparatus is constructed in such a manner that a beam irradiated from the laser source may be reflected by or transmitted through the optical disk to derive the focusing error signal, and so the focusing actuator may be operated in response to this focusing error signal to perform cooperative focusing.

The conventional optical pickup apparatus will be described in detail with reference to FIG. 1.

FIG. 1 is a schematic view for showing a conventional optical pickup apparatus. A light source 10 is provided with one laser diode to emit a laser beam. In the case of the three beams method, a grating 18 is provided at the front or the rear of a collimator lens 11, that is, between laser source 10 and collimator lens 11 or between collimator lens 11 and a beam splitter 12, which separates one beam into three beams. The laser beam irradiated from laser source 10 is changed into parallel beams by collimator lens 11. These parallel beams, is the case of the three beams method, are separated into three beams by grating 18 and then are transmitted through beam splitter 12, a $\lambda/4$ plate 13, and an objective lens 14 to be incident upon the surface R of the disc D with a beam spot of about 1 μm.

Beam splitter 12 has two right-angled prisms of which oblique (45°) facets meet with each other. A polarizing film is formed on the oblique facet. Thus, with ensuring the straight property of the incident beam, a part of the incident beam is transmitted through the prisms and the other part is reflected from the polarizing film at an angle of 90° together with the incident beam. Additionally, $\lambda/4$ plate 13 serves to avoid interference of the incident beam and the reflective beam, and converts a linearly polarized light beam into a circularly polarized light or vice versa.

The intensity of the light reflected from the disk D depends on the existence of a pit thereof having recorded data. The recorded information is read out on the basis of the intensity of the reflected light. The reflected light is transformed into the parallel light while going through objective lens 14, and polarized by 90° by $\lambda/4$ plate 13, and then is incident onto beam splitter 12. In this beam splitter 12, one part of the incident beam is reflected to be bent through 90°. A converging lens 15 is placed at the optical path of the reflected light to converge the reflected light. The reflected light converged by converging lens 15 goes through a cylindrical lens 16 (or knife edge) and then is received by a light receiving element (photodetector) 17 which is divided into four or six regions. The position errors of the pickup apparatus with respect to the disk D including a focusing error and a tracking error are detected from the state of the beam received on light receiving element 17, and focusing error signals and tracking error signals are generated on the basis of these focusing and tracking errors. A voice coil motor 19 as the objective lens actuator is actuated to move the objective lens in response to these focusing and tracking error signals, so that focusing and tracking can be controlled. The information on the disk is reproduced on the basis of the intensity of the reflected light which is determined by pit (P) on the disk (D).

According to the conventional optical pickup apparatus, so many optical constituent elements are required for reading information signals written in a recording medium and for controlling focusing and tracking, and therefore the structure of the optical pickup becomes complicated, the manufacturing cost becomes high, and the optical pickup apparatus becomes large. Further, it is difficult because so many optical constituent elements should be positioned precisely and minutely according to the optical path.

A hologram pickup apparatus as an example of another conventional optical pickup apparatuses has been suggested, which comprises a laser source for generating a laser beam, a diffraction grating for separating the laser beam into three beams for controlling tracking, a beam splitter for changing optical paths, and a hologram element which serves as a sensing lens and a light detecting element and forms an astigmatism for focusing. The hologram pickup apparatus is simpler in optical path than the optical pickup apparatus as shown in FIG. 1, and therefore its size and weight can be grately reduced, but still the hologram pickup apparatus has a troublesome problem in that optical constituent elements such as the hologram element and the laser source must be positioned precisely and minutely according to the optical path.

SUMMARY OF THE INVENTION

The present invention is intended to overcome the above-mentioned and numerous other disadvantages and deficiencies of the prior art.

Therefore, it is an object of the present invention to provide an optical pickup apparatus of which the optical path is largely reduced and the entire size is miniaturized by applying a polarization converting element and a birefringent element.

It is another object of the present invention to provide an optical pickup apparatus in which it is easy to precisely and minutely arrange optical constituent elements such as a laser source and a light receiving element according to the optical path by applying a polarization converting element and a birefringent element.

In order to achieve the above objects of the present invention, there is provided an optical pickup apparatus which comprises:

a laser source for generating a laser beam;

a lens group for determining paths of an incident beam to an information recording medium and a reflected beam from the information recording medium to read information recorded on the information recording medium, the lens group having a polarization converting means for polarizing a beam transmitted through the polarization converting means, a birefringent means for refracting the beam depending on a polarized state of the beam, and an objective lens through which the beam is transmitted to be focused on the information recording medium; and a receiving means for receiving the reflected beam which is polarized and refracted by the lens group.

Preferably, the laser source generates an ordinary ray composed of a linearly polarized light component refracted ordinarily in the birefringent means, and the birefringent means is a birefringent prism made of a transparent quartz. The polarization converting means may be a $\lambda/4$ plate, $\lambda/8$ plate, or $\lambda/16$ plate.

Furthermore, the optical pickup apparatus of the present invention has a diffraction grating which is located on a bottom of the birefringent means so that the laser beam separated into three beams can be incident on the birefringent. The lens group is preferably arranged in the order of the diffraction grating, the birefringent means, and the polarization converting means from the bottom. Thus, after the beam emitted from the laser source is transmitted through the diffraction grating, the birefringent means and the polarization converting means in that order, the beam is incident on the recording medium and then reflected from it. Subsequently, the beam is transmitted through the polarization converting means, the birefringent means and the diffraction grating in that order, then being received to the receiving means. Alternatively, the lens group may be arranged in the order of the birefringent means, the polarization converting means, the diffraction grating and the diffraction grating. In this case, after the beam emitted from the laser source is transmitted through the birefringent means and the polarization converting means in that order, the beam is incident on the recording medium and then reflected from it. Subsequently, the beam is transmitted through the diffraction grating, the polarization converting means and the birefringent means in that order, and then is received by the receiving means.

The optical pickup apparatus of the present invention has selectively a birefringent means having a grating pattern formed at the lower portion thereof without the diffraction grating, and thereby the same results can be achieved when performing the information reading operation, and the tracking and focusing control operations.

As above mentioned, according to the present invention since the information reading operation, and the tracking and focusing control operation can be achieved by properly using a polarizing phenomenon of the laser beam with the polarization converting means and a birefringent phenomenon with the birefringent means, the number of the optical constituent means required for manufacturing the optical pickup can be reduced and the optical path can simplified. Consequently, the positioning and arrangement of the constituent elements of the optical pickup such as the laser source and the receiving means becomes very easy and simple, and the optical pickup apparatus can be made compact.

BRIEF DESCRIPTION OF THE DRAWINGS

The present invention may be better understood and its numerous objects and advantages will be more apparent to those skilled in the art by reference to the accompanying drawings in which.

DESCRIPTION OF THE PREFERRED EMBODIMENT

The preferred embodiments of this invention will be described in detail with reference to the accompanying drawings.

EMBODIMENT 1

Figure 1:
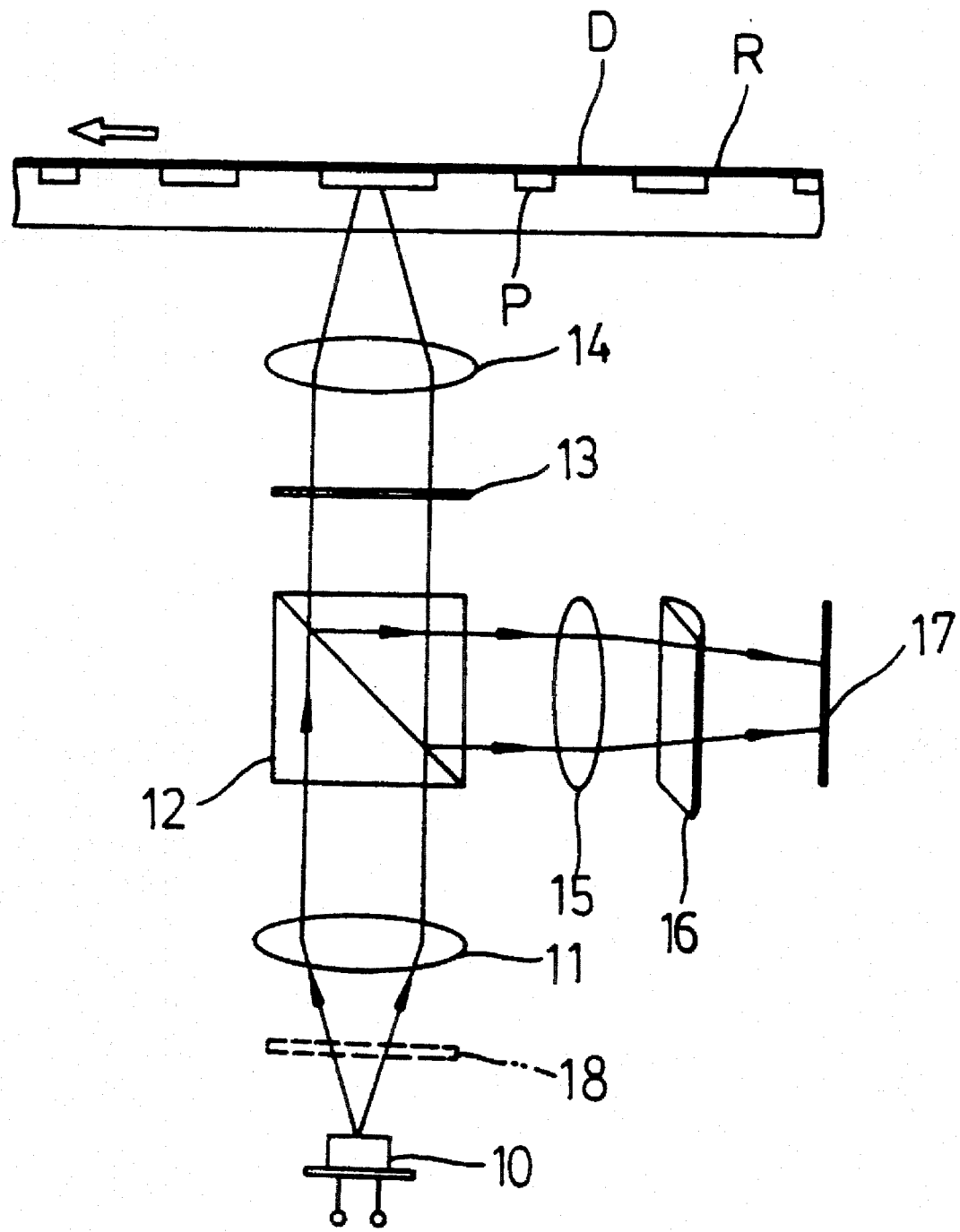
FIG. 1 is a schematic view for showing a conventional optical pickup apparatus.
Figure 2A:
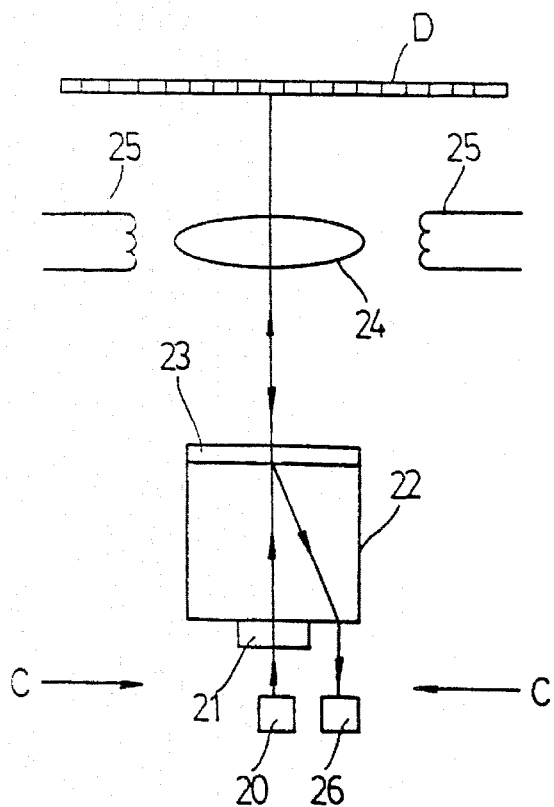
FIG. 2A is a schematic view for showing an optical pickup apparatus having a $\lambda/4$ plate and a birefringent prism according to a first embodiment of the present invention.
Figure 2B:
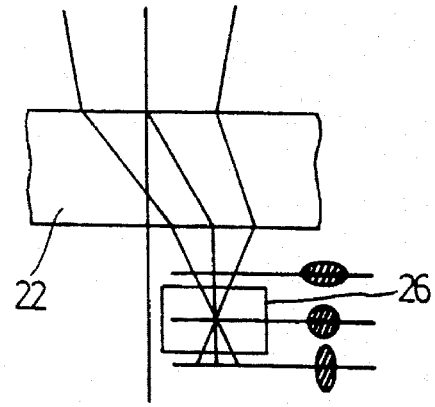
FIG. 2B is a view for illustrating the optical path of an extraordinary ray when the extraordinary ray is transmitted through the birefringent prism to be converged on a photodetector in the optical pickup apparatus of FIG. 2A.
Figure 2C:
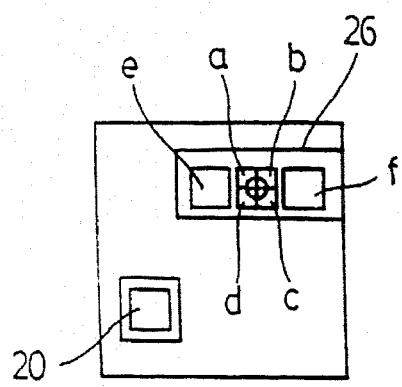
FIG. 2C is a cross-sectional view taken along line C—C of FIG. 2A.

FIG. 2A is a schematic view for showing an optical pickup apparatus having a λ/4 plate and a birefringent prism according to a first embodiment of the present invention. FIG. 2B is a view for illustrating the optical path of an extraordinary ray when the extraordinary ray is transmitted through the birefringent prism to be converged on a photodetector in the optical pickup apparatus of FIG. 2A. and FIG. 2C is a cross-sectional view taken along line C—C of FIG. 2A.

Figure 4:
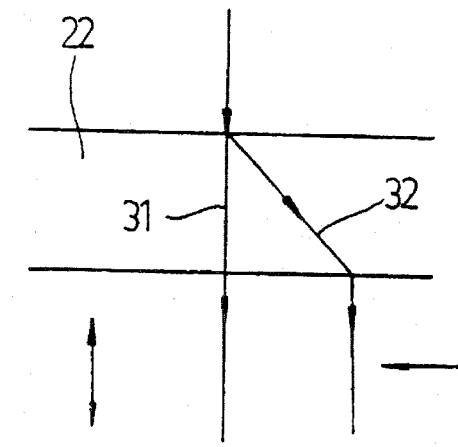
FIG. 4 is a view for illustrating an optical path when a non-polarized beam is incident on the birefringent prism in the optical pickup apparatus of FIG. 2A.

D denotes a disk as a data recording medium on which information is recorded. Reference numeral 20 denotes a laser source generating a laser beam for reading the information recorded on a disk. Reference numeral 21 denotes a diffraction grating for dividing the one laser beam from laser source 20 into three beams. Reference numeral 22 denotes a birefringent (anisotrophy uniaxial crystal) prism made of a transparent quartz in which the laser beam divided into the three beams through grating 21 is selectively refracted depending on its own polarization property. That is, as shown in FIG. 4, when a non-polarized beam is incident on birefringent prism 22, this beam is divided into two orthogonal components, i.e., a component 31 of an ordinary ray refracted according to the ordinary law of refraction and a component 32 of an extraordinary ray refracted according to the orientation of the crystal of the transmitting material regardless of the ordinary law of refraction. Similarly, when an ordinary ray or an extraordinary ray is incident on birefringent prism 22, this beam goes respectively through birefringent prism 22 with the optical path of the ordinary ray or the extraordinary ray without being split into the two components. Reference numeral 24 denotes an objective lens which converges the laser beam, which has been generated from laser source 20 and has been transmitted through a λ/4 plate 23, on disk D and then reflects the beam reflected from disk D to λ/4 plate 23. Reference numeral 26 denotes a light-receiving element, for example, a 6-division photodetector for receiving the laser beam having passed through λ/4 plate 23, birefringent prism 22 after being reflected from disc D, which is disposed on the same plane with laser source 20. Reference numeral 25 denotes a two-axial objective lens actuator for controlling focusing and tracking of the laser beam which is converged on the disk by objective lens 24. Objective lens actuator 25 is actuated depending on the tracking and focusing error signals generated from photodetector 26.

Hereinafter, an operation of the optical pickup apparatus in accordance with the present embodiment will be described.

The laser beam of the component of the ordinary ray is generated by laser source 20. The laser beam is transmitted through birefringent prism 22 after being divided into three beams by diffraction grating 21. Here, since the laser beam is composed of the ordinary ray, the beam is transmitted through birefringent prism 22 depending on the ordinary law of refraction.

Figure 3:
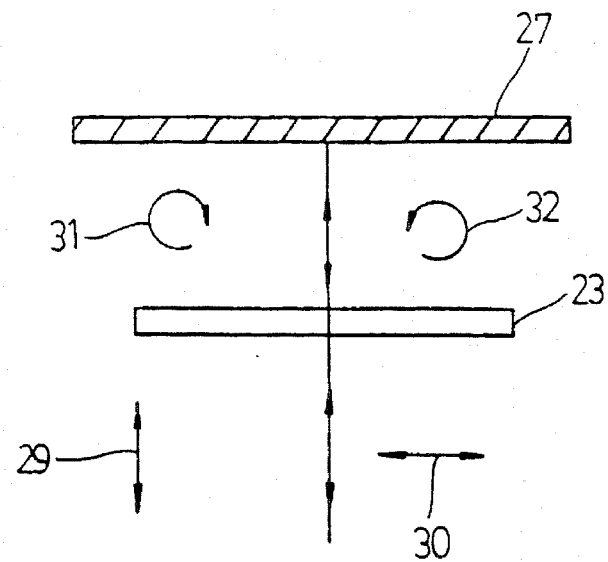
FIG. 3 is a view for illustrating polarized states before and after the laser beam is transmitted through the $\lambda/4$ plate in the optical pickup apparatus of FIG. 2A.

The laser beam of the linearly polarized light which has passed through in this way is converted into the circularly polarized light through λ/4 plate 23 as shown in FIG. 3 (the left side), and then this converted beam is converged on disk D via objective lens 24. This beam is reflected from disc D, and simultaneously the phase of the beam is inverted by 180°. That is, the beam is converted into the circularly polarized light of which the rotating direction is inverted. This inverted beam is incident again onto λ/4 plate 23 via objective lens 24. After passing through λ/4 plate 23, this beam becomes the linearly polarized light rotated through 90° compared with the linearly polarized light of the ordinary component generated from laser source 20, that is, this beam becomes the linearly polarized light of the extraordinary component. Thus, this beam which has been converted into the linearly polarized light of the extraordinary component through λ/4 plate 23 is incident on birefringent prism 22, and transmitted through birefringent prism 22 while following the optical path of the extraordinary ray in birefringent prism 22 as shown in FIG. 4 (the right side). Thus, the beam converges at a position which is disposed horizontally on the same plane with respect to laser source 20. That is, according to the present embodiment, the information can be read out of disc D in the state that the laser source 20 and a light-receiving element, for example, 6-division photodetector 26, are disposed on the same plane.

For example, the laser beam generated from laser source 20 may be a beam of a divergent type and the beam reflected from disk D may be a beam of a convergent type. When this divergent beam or convergent beam is of an extraordinary ray, the beam is extraordinarily refracted depending on its crystal orientation in the birefringent prism and proceeds in a different direction from the ordinary refracting direction. Thus, as shown in FIG. 2B, the astigmatism occurs in a case that the divergent beam or convergent beam of the extraordinary ray is vertically incident on birefringent prism 22 to trace the path of the extraordinary ray. However, the non-axial aberration such as astigmatism or coma does not occur in a case that the divergent beam or convergent beam of an ordinary ray is vertically incident on birefringent prism 22. Therefore, in the case of the convergent beam of the extraordinary ray, when 6-division photodetector 26 is properly placed at a position which is somewhat apart from laser source 20 on the same plane as shown in FIG. 2C, the beam can be detected to focus on photodetector 26 using the astigmatic method without the component such as a knife edge or cylindrical lens as shown in FIG. 2B. The position at which the photodetector is placed can be easily determined depending on the birefringent index of birefringent prism 22, its thickness, etc. Thus, two guide beams of first order diffracted beams are respectively received by the e-cell and f-cell of 6-division photodetector 26, and the tracking signal is detected by using the difference between light quantities of e-cell and f-cell [Q(e)–Q(f)]. The main beam of zero order diffracted beam is received by the four (a, b, c, d) cells arranged at the center portions of the 6-division photodetector 26, and the signals received from these cells are used to read the information written on the disk, while the focusing signal is detected by using the difference between the sum of light quantities of a-cell and c-cell and the sum of light quantities of b-cell and d-cell [{Q(a)+Q(c)}−{Q(b)+Q(d)}].

As a first variant example of the optical pickup apparatus having the λ/4 plate and the birefringent prism as in Embodiment 1, an optical pickup apparatus having the λ/8 plate may be used instead of the λ/4 plate as the polarization converting element. According to the optical pickup apparatus, the laser beam of the linearly polarized light generated from the laser source is converted into the elliptically polarized light of which the plane of the polarization is rotated by 45° after passing through the λ/8 plate. Then, the phase of this beam is inverted by 180° after being reflected from the disk and thus the laser beam is converted into the elliptically polarized light rotated by 225°. Thereafter, the phase of the laser beam is converted by 45° after passing through the λ/8 plate and thus the laser beam is converted into the circularly polarized light rotated by 270°. This circularly polarized light has both the ordinary component and the extraordinary component of light, and therefore, this beam is separated into the rays of these two components after passing through the birefringent prism and then refracted. That is, while the ordinary component of light returns towards the laser source, the extraordinary component of light is refracted depending on the crystal orientation of the birefringent prism. The extraordinary beam is received by the photodetector after passing through the birefringent prism, and consequently, the same results can be achieved as in Embodiment 1 by performing the information reading operation, and the tracking and focusing control operations.

As a second variant example of the optical pickup apparatus in Embodiment 1, an optical pickup apparatus having the λ/16 plate may be used instead of the λ/4 plate as the polarization converting element. In this optical pickup apparatus, the laser beam of the linearly polarized light generated from the laser source is converted by 22.5° in its phase after passing through the λ/16 plate. Subsequently, the phase of the laser beam is inverted by 180° after being reflected from the disk and thus its plane of the polarization is rotated by 202.5°. Thereafter, the phase of the laser beam is converted by 22.5° after passing through the λ/16 plate so that the laser beam is converted into the elliptically polarized light rotated by 235°. This elliptically polarized light also has both the ordinary component and the extraordinary component of light, and therefore, this beam is separated into the laser beams of the two components which are refracted through the birefringent prism. That is, the ordinary component of light returns towards the laser source and the extraordinary component of light is refracted depending on the crystal orientation of the birefringent prism. The extraordinary beam is received by the photodetector after passing through the birefringent prism, and consequently, the same results can be achieved as in Embodiment 1 by performing the information reading operation, and the tracking and focusing control operations.

EMBODIMENT 2

Figure 5:
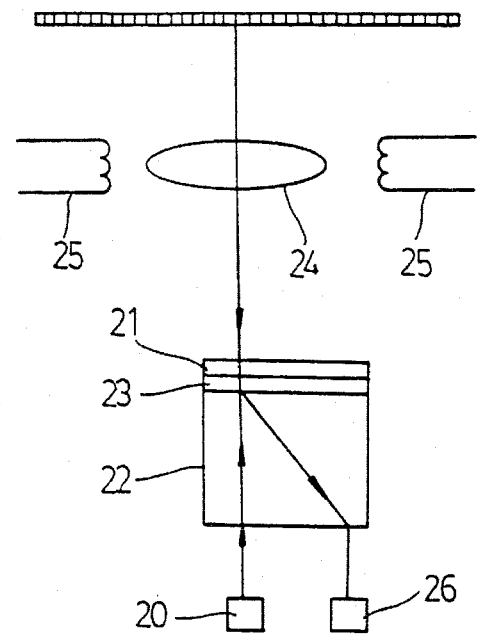
FIG. 5 is a schematic view for showing an optical pickup apparatus having a $\lambda/4$ plate and a birefringent prism in which the $\lambda/4$ plate is located on the birefringent prism, according to a second embodiment of the present invention.

FIG. 5 is a schematic view for showing an optical pickup apparatus having a λ/4 plate and a birefringent prism in which the λ/4 plate is located on the birefringent prism, according to a second embodiment of the present invention.

In this embodiment, as shown in FIG. 5, the lens group is arranged in the order of the birefringent element, the λ/4 plate, and the diffraction grating in the proceeding direction of the beam emitted from the laser source instead of the optical pickup arranged in the order of the diffraction grating, the birefringent element, and the λ/4 plate as in Embodiment 1. According to this embodiment, the diffraction grating dividing the beam emitted from the laser source into three beams is disposed on the λ/4 plate, so that the beam can be diffracted by grating 21 and then trace the path of the extraordinary ray to be received by the photodetector. Consequently, the same results can be achieved by performing the information reading operation, and the tracking and focusing control operations as in Embodiment 1.

EMBODIMENT 3

Figure 6:
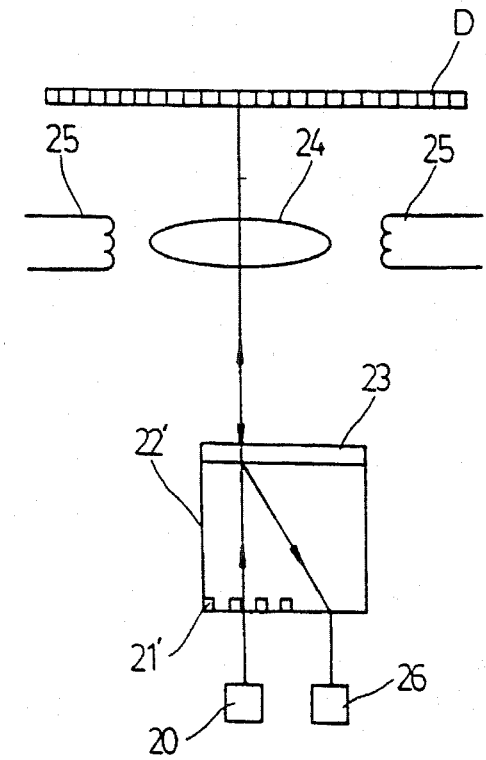
FIG. 6 is a schematic view for showing an optical pickup apparatus having a $\lambda/4$ plate and a birefringent prism in which the birefringent prism has a diffraction grating pattern formed at the lower portion thereof without a diffraction grating, according to a third embodiment of the present invention.

FIG. 6 is a schematic view for showing an optical pickup apparatus having a λ/4 plate and a birefringent prism in which the birefringent prism has a diffraction grating pattern formed at the lower portion thereof without a diffraction grating, according to a third embodiment of the present invention.

The optical pickup apparatus in this embodiment, as shown in FIG. 6, is provided with a birefringent prism having a grating pattern formed at the lower portion thereof instead of the diffraction grating mounted in the optical pickup of Embodiment 1 (FIG. 2), and thereby the same results can be achieved by performing the information reading operation, and the tracking and focusing control operations as in Embodiment 1. In FIG. 6, the same reference numerals as those in FIG. 2 denote the same constructional components. Reference numeral 22' denotes a birefringent prism, for example, a birefringent (anisotrophy uniaxial crystal) prism made of a transparent quartz, having grating pattern 21' formed at the lower portion thereof by an etching processing. Thus, the laser beam emitted from laser source 20 is divided into the three beams through grating pattern 21' formed at the lower portion of birefringent prism 22', and the divided laser beams are selectively refracted depending on its own polarization property through birefringent prism 22'.

The construction and operation in this embodiment is the same as in Embodiment 1 except for the above construction and operation.

That is to say, the laser beam of the component of the ordinary ray is generated from laser source 20. The laser beam is divided into the three beams through grating pattern 21' formed at the lower portion of birefringent prism 22' and then the three beams are transmitted through birefringent prism 22'. At this time, since the laser beam is composed of the ordinary ray, the beam is transmitted through birefringent prism 22' depending on the ordinary laws of refraction.

By this way, the laser beam is converted in its polarizing orientation when being transmitted through λ/4 plate 23, and then the converted beam is converged on disk D via objective lens 24. This converged beam is reflected from disc D, simultaneously the phase of the beam being inverted by 180°. Subsequently, after passing through objective lens 24, λ/4 plate 23, and birefringent prism 22' in that order, the laser beam is received by photodetector 26. Here, diffraction grating pattern 21' is preferably formed at a position of the lower portion of birefringent prism 22' corresponding to a position where the grating is placed as shown in FIG. 2 so that the laser beam can not be influenced by diffraction grating pattern 21' when received on photodetector 26. Thus, the information reading operation, and the tracking and focusing control operations are carried out depending on the state of the beam received on photodetector 26.

As in Embodiment 1, the optical pickup apparatus according to the present embodiment having a λ/4 plate and a birefringent prism which has a diffraction grating pattern formed on its own without a diffraction grating has many variant examples. The same results can be achieved by performing the information reading operation, and the tracking and focusing control operations, for example, in the case of the optical pickup having the λ/8 plate or the λ/16 plate instead of the λ/4 plate.

According to the present invention since the information reading operation, and the tracking and focusing control operation can be achieved by properly using a polarizing phenomenon of the laser beam with the polarization converting element and a birefringent phenomenon with the birefringent element, the number of the optical constituent elements required for manufacturing the optical pickup can be reduced and the optical path be shortened. Consequently, the positioning and arrangement of the constituent elements of the optical pickup such as the laser source and the receiving element becomes very easy and simple, and the optical pickup apparatus can be made compact.

It is understood that various other modifications will be apparent to and can be readily made by those skilled in the art without departing from the scope and spirit of this invention. Accordingly, it is not intended that the scope of the claims appended thereto be limited to the description as set forth herein, but rather that the claims be constructed as encompassing all the features of the patentable novelty that reside in the present invention, including all the features that would be treated as equivalents thereof by those skilled in the art to which this pertains.

What is claimed is:

1. An optical pickup apparatus comprising:

a laser source for generating a laser beam;

a lens group for determining paths of an incident beam to an information recording medium and a reflected beam from the information recording medium to read information recorded on the information recording medium, said lens group having a polarization converting means for polarizing a beam transmitted through the polarization converting means, a birefringent means for refracting the beam depending on a polarized state of the beam, and an objective lens through which the beam is transmitted to be focused on the information recording medium; and a receiving means for receiving the reflected beam which is polarized and refracted by the lens group.

2. The optical pickup apparatus as claimed in claim 1, wherein said receiving means is disposed on the same plane as said laser source.

3. The optical pickup apparatus as claimed in claim 1, wherein said laser source generates an ordinary ray composed of a linearly polarizing component to be refracted ordinarily in the birefringent means.

4. The optical pickup apparatus as claimed in claim 1, wherein said birefringent means is a birefringent prism made of a transparent quartz.

5. The optical pickup apparatus as claimed in claim 1, wherein said polarization converting means comprises a $\lambda/4$ plate.

6. The optical pickup apparatus as claimed in claim 1, wherein said polarization converting means comprises a $\lambda/8$ plate.

7. The optical pickup apparatus as claimed in claim 1, wherein said polarization converting means comprises a $\lambda/16$ plate.

8. The optical pickup apparatus as claimed in claim 1, wherein said optical pickup apparatus has a diffraction grating for dividing the laser beam into three beams in order to control tracking.

9. The optical pickup apparatus as claimed in claim 8, wherein said lens group is arranged in the order of the diffraction grating, the birefringent means, and the polarization converting means from the bottom, and thereby after the beam emitted from the laser source is transmitted through the diffraction grating, the birefringent means and the polarization converting means in that order in a proceeding direction of the beam, the beam is incident on the recording medium and then reflected from the recording medium, and after being transmitted through the polarization converting means, the birefringent means and the diffraction grating in that order, the beam is received by the receiving means.

10. The optical pickup apparatus as claimed in claim 8, wherein said lens group is arranged in the order of the birefringent means, the polarization converting means, and the diffraction grating from the bottom, and thereby after the beam emitted from the laser source is transmitted through the birefringent means, the polarization converting means, and the diffraction grating in that order in the proceeding direction of the beam, the beam is incident on the recording medium and then reflected from it, and inversely after being transmitted through the diffraction grating, the polarization converting means, and the birefringent means in that order, the beam is received by the receiving means.

11. The optical pickup apparatus as claimed in claim 1, wherein said birefringent means has a diffraction grating pattern formed at the lower portion thereof to divide the laser beam into three beams for controlling tracking.

12. The optical pickup apparatus as claimed in claim 11, wherein said diffraction grating pattern is formed by an etching processing.

13. An optical pickup apparatus comprising:

a laser source for generating a laser beam of an ordinary ray;

a lens group for determining paths of an incident beam to an information recording medium and a reflected beam from the information recording medium in order to read information recorded on the information recording medium, said lens group including a polarization converting means for polarizing a beam transmitted therethrough, a birefringent means for refracting the beam depending on its polarized state, a diffraction grating for dividing the laser beam into three beams in order to control tracking, and an objective lens through which the beam is transmitted to be focused on the information recording medium; and a receiving means for receiving the reflected beam which is polarized and refracted by the lens group.

14. An optical pickup apparatus comprising:

a laser source for generating a laser beam of an ordinary ray;

a lens group for determining paths of an incident beam to an information recording medium and a reflected beam from the information recording medium in order to read information recorded on the information recording medium, said lens group including a polarization converting means for polarizing a beam transmitted through the polarization converting means, a birefringent means for refracting the beam depending on a polarized state of the beam and an objective lens through which the beam is transmitted to be focused on the information recording medium, said birefringent means having a diffraction grating pattern formed at the lower portion of the birefringent means for dividing the laser beam into three beams for controlling tracking;

a receiving means for receiving the reflected beam which is polarized and refracted by the lens group.

* * * * *